Jan. 14, 1958  E. PFARRWALLER  2,819,736
PERIODICALLY ACTING THREAD BRAKE
Filed Jan. 26, 1954  3 Sheets-Sheet 1

INVENTOR.
ERWIN PFARRWALLER.
BY K. A. Mayr
ATTORNEY.

Jan. 14, 1958  E. PFARRWALLER  2,819,736
PERIODICALLY ACTING THREAD BRAKE
Filed Jan. 26, 1954  3 Sheets-Sheet 2
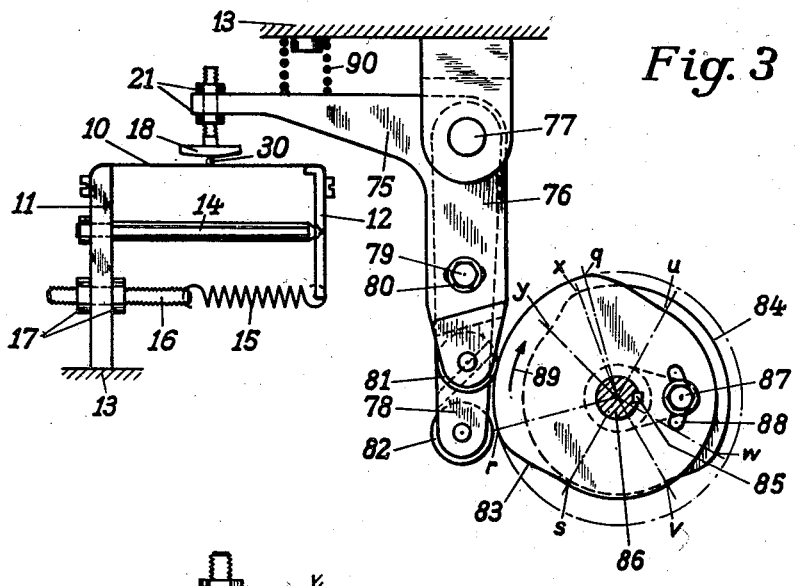
Fig. 3
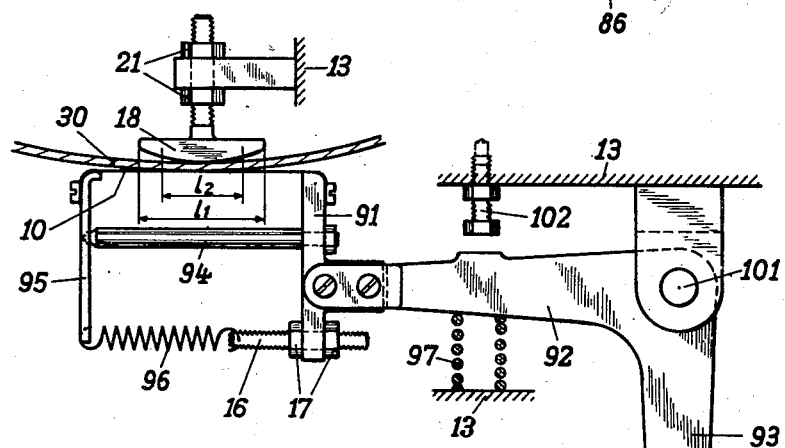
Fig. 6
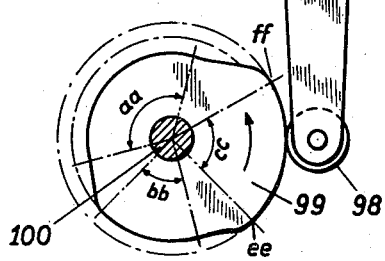
INVENTOR.
ERWIN PFARRWALLER.
BY K. A. Mays
ATTORNEY.

Jan. 14, 1958  E. PFARRWALLER  2,819,736
PERIODICALLY ACTING THREAD BRAKE
Filed Jan. 26, 1954  3 Sheets-Sheet 3

INVENTOR.
ERWIN PFARRWALLER,
BY
ATTORNEY.

United States Patent Office 2,819,736
Patented Jan. 14, 1958

2,819,736

PERIODICALLY ACTING THREAD BRAKE

Erwin Pfarrwaller, Winterthur, Switzerland, assignor to Sulzer Freres, Societe Anonyme, Winterthur, Switzerland, a corporation of Switzerland Application January 26, 1954, Serial No. 406,115

Claims priority, application Switzerland February 7, 1953

8 Claims. (Cl. 139—194)

The present invention relates to a periodically acting thread brake for textile machines, the brake having a yieldable brake element which is stretched by tension forces and cooperates with a rigid brake element for braking a thread moving between the two elements.

The object of the invention resides in the provision of a thread brake for textile machines in which a thread moves between a yieldable and a rigid brake element, at least one brake element being so controlled that it is either removed from the other brake element, or assumes one of two braking positions producing a constant but different braking force in either one position, adjusting means being provided for regulating the brake effect in each braking position.

The novel features which are considered characteristic of the invention are set forth with particularity in the appended claims. The invention itself however and additional objects and advantages thereof will best be understood from the following description of the embodiments thereof when read in connection with the accompanying drawing in which:

Fig. 3 is a diagrammatic front view of a modification of the thread brake, shown in Fig. 1;

Fig. 6 is a diagrammatic side view of another modification of a thread brake according to the invention, the brake having a stationary rigid brake element and a movable yielding brake element;

The same numerals designate the same parts in all figures.

Figure 1:
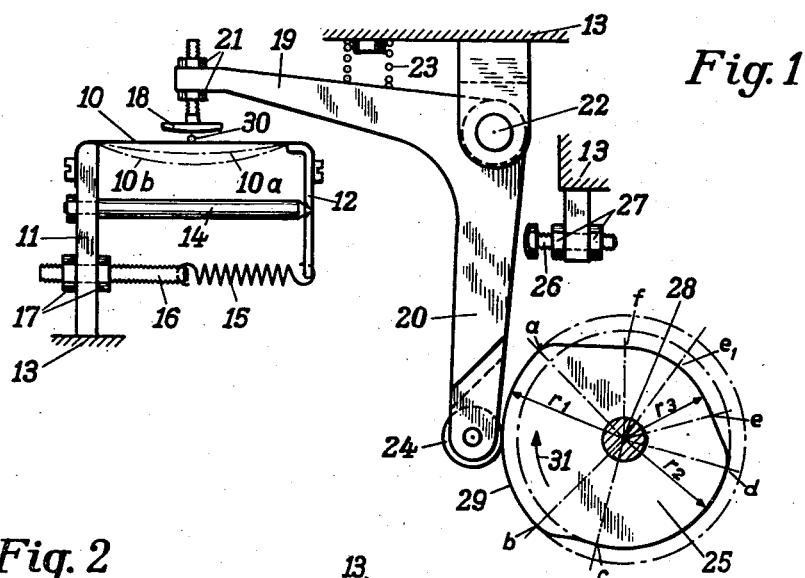
Fig. 1 is a diagrammatic front view of a thread brake according to the invention having a cam disc for moving the rigid brake element to three different positions.

The thread brake according to Fig. 1 comprises a yieldable brake element 10 which can be stretched by a tensioning force, one end of the element being connected to a stationary member 11 and the other end being connected to a lever 12. Member 11 is connected to the frame 13 of the textile machine, a pin 14 being connected with the member 11, the free end of the pin forming a fulcrum for the lever 12 which is actuated by a tension spring 15 for tensioning the yieldable brake element 10 which may be formed by a thin steel strip. The tension force of the spring 15 can be adjusted by manipulation of a screw 16 extending through a bore in the member 11 and being fixed thereto by nuts 17. A rigid brake element or brake shoe 18 cooperates with the yieldable element 10, the shoe 18 being mounted on a horizontal arm 19 of an elbow lever having a vertical arm 20, the latter being provided with a cam follower roller 24.

The elbow lever 19, 20 with the roller 24 following the cams of a cam disc 25 serves as a control device for successively moving the brake shoe 18 into a plurality of predetermined different operating positions during one operating cycle of the textile machine. The lever 19, 20 swings about a stationary pin 22 mounted on the frame 13. A compression spring 23 presses against the arm 19 with a force which is greater than the brake force which acts in the opposite direction, so that the roller 24 is pressed against the disc 25 or the arm 20 is pressed against an adjustable abutment 26 when the arm 19 is in its lowermost position.

In order to adjust the braking force acting in each braking position of the brake to suit certain operating conditions, for example for producing a certain binding of the fabric produced on a loom, the devices described below are provided: the lowermost position of the arm 19 is determined by manipulation of nuts 27 for moving the abutment screw 26 extending through a bore in a support fixed to the frame 13 to the left or to the right. The distance between the brake shoe 18, which is fixed to the end of a threaded bolt extending through a bore in the arm 19, and the arm 19, i. e. the distance between the brake shoe 18 and the brake band 10 can be adjusted by manipulation of nuts 21.

The device operates as follows:

The cam disc 25 is mounted on a shaft 28. The three portions $a$—$b$, $c$—$d$, and $e$—$f$ of the cam 29 have different radii $r_1$, $r_2$, and $r_3$, respectively, corresponding to three different brake positions. The aforesaid cam portions are connected by intermediate cam portions $b$—$c$, $d$—$e$, and $f$—$a$.

The brake is disengaged in the position shown in Fig. 1, i. e. the brake shoe 18 is lifted from the brake band 10 so that the thread 30 can run between the brake elements 10, 18 without being braked. If the cam disc 25 is revolved, the roller 24 rolls from the arc of the cam portion $a$—$b$ and moves along the intermediate portion $b$—$c$ onto the arc formed by the cam portion $c$—$d$. Because the radius $r_2$ is smaller than the radius $r_1$, the spring 23 presses the arm 19 downwards and the brake shoe 18 presses the thread 30 onto the band 10. Since the force exerted by the spring 23 on the brake shoe 18 is much greater than the brake pressure produced by the steel band 10 and acting upwards, the band 10 is depressed into the position 10a.

Upon depression of the band 10, the lever 12 swings about the point of the pin 14 and pulls the free end of the spring 15 to the right whereby the tension of the spring 15 increases. The stretching force acting on the band 10 is increased in the same degree as the tension of the spring 15, producing a pressure acting vertically upwards on the shoe 18 and on the thread 30. The braking force is therefore about proportionate to the degree of deflection of the brake band 10.

If the cam disc 25 is rotated in the direction of the arrow 31, the roller 24 passes over the intermediate cam surface $d$—$e$ onto the surface portion $e$—$f$ which has the smallest radius ($r_3$). The arm 19 can therefore be further depressed by the spring 23 until the arm 20 abuts against the abutment 26. When the lever 19, 20 has reached this position, the roller 24 leaves the cam surface portion $e$—$f$. The band 10 is depressed into position 10b whereby the lever 12 swings in counterclockwise direction, increasing the tension of spring 15 and the brake force exerted by the band 10 on the thread 30.

The cam portions c—d and e—f are coordinated to two brake positions having a different braking effect. The brake effect of each brake position can be adjusted either individually or the braking effect of the two positions may be adjusted simultaneously. The brake effect and the tension produced thereby in the thread 30 can be changed by changing the length of thread engaged by the brake elements 10, 18 in addition to changing the braking force produced by the brake. This additional effect is particularly noticeable, if the thread moves parallel to the longitudinal axis of the brake band 10, as shown in Fig. 6. The deflection of the band 10 is greater, if the brake force is greater and the engaged length of the thread is also greater, if the face of the brake shoe 18 is convex. If the the thread 30 moves transversely to the band 10, the engaged length of the thread changes but little.

For regulating the weaker brake force produced by the elements 10 and 18 when responding to the cam portion c—d, the brake shoe 18 may be lowered or raised by manipulating the nuts 21. For regulating the greater brake force the position of the abutment screw 26 is changed by manipulation of the nuts 27 for limiting counterclockwise movement of the lever 20 and the deflection of the band 10 in the position 10b. A change of the position of the brake shoe 18 relatively to the lever 19 affects not only the braking position 10a, but also the braking position 10b, and if it is desired to change the weaker brake force and leave the stronger brake force unchanged, the nuts 27 must be manipulated, so that the desired brake effect is produced in the position 10b. The strength of spring 23 must be so that the arm 20 is firmly pressed against the abutment 26 also when the brake operates at greatest braking force.

The cam disc 25 may be actuated by manipulation of the shaft 28 or the shaft 28 can be driven periodically or continuously by means not shown by the machine of which the brake forms a part.

The thread brake according to the invention may be used in combination with a spinning machine, a knitting machine, a knotting machine, or a twisting machine. It may also serve for braking the weft thread in a loom for weaving, having weft thread spools which are arranged outside of the weft inserting means—gripper shuttles or weft thread inserting needles.

The period during which the different brake positions of the brake according to the invention are produced in a predetermined sequence by the configuration of the cam 29, usually coincides with a working period of the machine with which the brake is connected. If the brake is used with a loom of the aforementioned type, the shaft 28 may, for example, be driven by the main shaft of the loom so that the shaft 28 makes one revolution during the period between two shuttle picks. The length of the cam portions a—b, c—d, e—f and the periods during which they actuate the brake may be so chosen relatively to the moment the shuttle is picked that the roller 24 (Fig. 1) is on the cam portion a—b when the shuttle is picked, for lifting the brake shoe 18; the cam portion c—d, effecting a relatively weak brake force, passes the roller 24 when the shuttle reaches the end of the shed; the cam portion e—f, effecting a relatively strong brake force, passes the roller 24 when the shuttle is retarded in the shuttle brake of the shuttle receiving mechanism. The relatively strong thread brake force must be so great that the thread is retarded substantially in the same manner as the shuttle to avoid curling of the thread, if this is not desired.

The connection between the main shaft of the loom and the shaft 28 may be so constructed that it produces an intermittent rotation of the latter or it may be adapted to produce a continuous rotation of the cam disc. The lengths and configurations of the cam portions a—b, c—d, e—f and the lengths and configurations of the intermediate cam portions b—c, d—e, f—a must be designed accordingly.

Figure 2:
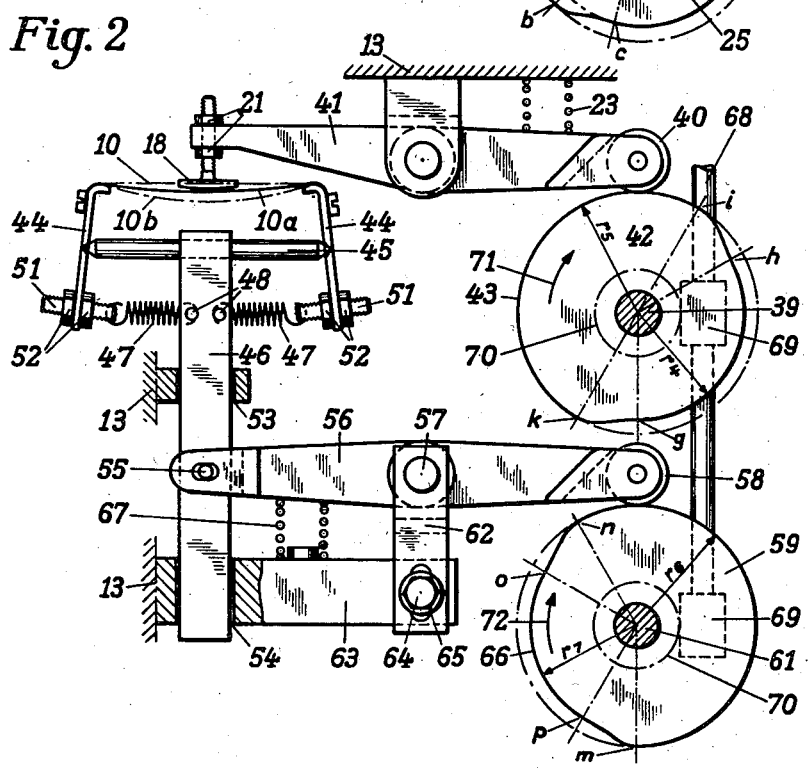
Fig. 2 is a diagrammatic front view of a modified thread brake according to the invention having a cam controlled drive for the rigid as well as for the yieldable brake element.

In the modification shown in Fig. 2, the roller 40 supported at one end of a two-arm lever 41 cooperates with a cam disc 42 whose cam 43 comprises only two part-circular portions g—h and i—k having different radii $r_4$ and $r_5$, respectively. The ends of the yieldable brake band 10 are individually connected with two-arm levers 44 which individually pivotally rest on the pointed ends of a pin 45 mounted on a slide member 46. The levers 44 are held in position by means of tension springs 47. One end of each of the latter is connected to a pin 48 mounted on the member 46, the other end of the springs 47 being individually connected with threaded pins 51 which are individually adjustably connected with the levers 44 by means of nuts 52. The springs 47 tend to tension the brake band 10.

The slide member 46 is slidably supported in bearings 53 and 54 and is connected by a pivot 55 with one end of a two-arm lever 56 which swings on a pin 57, the free end of the lever 56 carrying a roller 58 which follows a cam 59 mounted on a shaft 61. The pin 57 rests in a fork 62 which embraces an arm 63 mounted on a frame 13 and is clamped to the arm 63 by a bolt 64. Slots 65 in the fork 62 afford vertical displacement of the latter and of the slide member 46 so that the relative position of the brake band 10 and of the brake shoe 18 can be changed.

If the roller 40 engages the portion g—h of the cam surface 43 and if the roller 58 engages the portion m—n of the cam surface 66, the brake elements 10 and 18 are out of engagement. In the illustrated position in which the band 10 is deflected to the position 10a producing a relatively small brake force, the cam portion i—k having the relatively great radius $r_5$ is below the roller 40. The roller 58 is still on the arc m—n having the relatively great radius $r_6$ so that the slide member 46 is in its lower position. Upon clockwise rotation of the cam disc 59, the roller 58 engages the cam portion o—p having a relatively small radius $r_7$. The roller 58 is pressed downwards by a compression spring 67, the lever 56 swinging clockwise and raising the slide member 46 together with the levers 44.

Since the brake shoe 18 remained in the same position, the roller 40 remaining on the cam portion i—k, the brake band 10 is deflected until it reaches the position 10b. The increased deflection of the band 10 causes stretching of the tension springs 47 and increase of the brake force.

The shafts 39 and 61 may be individually turned by hand. If they are driven by a machine, their relative position is preferably maintained by a shaft 68 having worms 69 individually engaging worm wheels 70 which are fast on the shafts 39 and 61. The shaft 68 may, for example, be driven by the main shaft of a loom for weaving.

Figure 4:
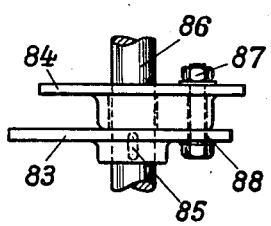
Fig. 4 is a top view of the cams for actuating the thread brake, shown in Fig. 3.

In the modification shown in Fig. 3, one end of the brake band 10 is connected with a post 11 on the frame 13, the other end being connected with a lever 12, the band being tensioned by a tension spring 15 interconnecting the lever 12 and the post 11 as in the modification, shown in Fig. 1. The brake shoe 18 is connected to an elbow lever 75, 76 swinging on a fulcrum 77. A lever 78 swings on the fulcrum 77 and is adjustably connected with the arm 76 of the lever 75, 76 by means of a screw 79 extending through a slot 80 in the arm 76. The free ends of the arm 76 and of the lever 78 support cam follower rollers 81 and 82, respectively, which cooperate with cam discs 83, 84, respectively. The cam disc 83 is fixed by means of a key 85 (Fig. 4) or by other suitable means to the shaft 86. The cam disc 84 is rotatable on shaft 86 and is connected with the disc 83 by means of a screw 87. The screw 87 extends through a slot 88 in the disc 83, so that the discs 83 and 84 can be revolved relatively to one another.

Figure 5:
Fig. 5 is a diagram showing the brake forces produced by the brake, shown in Figs. 3 and 4 in different operating positions.

If the shaft 86 makes a full revolution in the direction of the arrow 89, consecutive brake positions are produced, as diagrammatically illustrated in Fig. 5. The position of the lever 75, 76, shown in Fig. 3, corresponds to the moment $t_0$, shown in Fig. 5. The roller 81 abuts against the cam portion $q$—$r$ of the cam disc 83, whereas the roller 82 is not in contact with the cam disc 84. The arm 75 is so much lifted that the brake elements 10, 18 do not contact the thread 30 and the brake is disengaged.

If the shaft 86 continues to rotate in the direction of the arrow 89, the roller 81 follows the intermediate cam portion $r$—$s$ and contacts the cam portion $s$—$u$ from the moment $t_2$. The spring 90 depresses the arm 75, and the brake shoe 18 is in its lowermost position producing the greatest brake force $B_2$. Upon continued turning of the cam discs, the roller 82 runs on the intermediate cam portion $v$—$w$ of the cam disc 84 at the moment $t_3$, lever 78 moving to the left and the arm 75 being lifted somewhat from its lower end position, the brake shoe 18 being from the moment $t_4$ in the position producing the smaller brake force $B_1$. At the moment $t_5$ the roller 81 runs again on the cam disc 83—on the intermediate cam portion $u$—$q$—and the roller 82 is lifted from the disc 84 before it has reached the end of the arc $w$—$x$, if the discs 83 and 84 are in the relative position shown in Fig. 3.

By loosening the screw 87 and turning the cam disc 84 relatively to the disc 83, beginning of the brake effect produced by the cam disc 84 can be set before or after the moment $t_4$. If the cam portion $q$—$r$ partly overlaps the cam portion $w$—$x$ at $x$, the duration of the brake effect produced by the cam disc 83 can be changed. If the point $x$ or $y$ is at the right side of point $u$, the greatest brake effect is produced once more between the points $y$ and $u$.

For adjusting the brake effect $B_1$ produced by the cam portion $w$—$x$, the screw 79 is manipulated, affording rotation of the arm 78 relatively to the arm 76 and defining the space between the roller 82 and the cam disc 84. The brake effect $B_2$ produced by the cam portion $s$—$u$ can be adjusted by manipulation of the nuts 21; if this adjustment affects the brake force $B_1$, this can be counteracted by manipulation of the screw 79.

In the modification illustrated in Fig. 6, the brake shoe 18 is mounted on the frame 13; its elevation can be changed by manipulating the nuts 21. The brake band 10 is connected with a movable frame, including a post 91 which is connected with an arm 92 of an elbow lever 92, 93. A pin 94 is screwed into the post 91. The free end of the pin 94 forms the fulcrum of a two-arm lever 95. The ends of the brake band 10 are individually connected with the part 91 and with one arm of the lever 95. A tension spring 96 interconnects the other arm of the lever 95 and an adjustment screw 16 secured by nuts 17 to the part 91. Manipulation of the nuts 21 affords adjustment of the tension of the spring 96 and of the brake band 10.

The arm 92 is pressed upwards by means of a compression spring 97, thereby pressing the roller 98 on arm 93 against the cam disc 99 which is mounted on a shaft 100. The elbow lever 92, 93 swings about a pin 101. An abutment 102 adjustably connected with the frame 13 defines the upper end position of the arm 92 and the deflection of the brake band 10 in the position of greatest brake effect. If the arm 92 contacts the abutment 102, the roller 98 does not contact the portion $aa$ of the cam disc 99. The roller 98 is forced to the right upon engagement of section $bb$ of the cam 99 so that the arm 92 is lowered and disengaged from the abutment 102 and the brake band 10 is also lowered, reducing the deflection of the band and the brake effect. Thereby not only the brake pressure is somewhat reduced, due to the expansion of the spring 96, but also the length of the thread 30 which is engaged by the brake shoe 18 and by the band 10 is reduced from $l_1$ to $l_2$. The desired brake effect in this position is adjusted by displacement of the brake shoe 18 by manipulation of the nuts 21. When engaging section $cc$, the roller 98 is moved still farther to the right and the brake band 10 is so far removed from the shoe 18 that the thread can freely pass through the brake.

The cam discs may be provided with more than three cam portions. The three operating positions of the brake: great brake force, little brake force, or disengaged, may be arranged in many different sequences.

By providing more than three cam portions of different radii, one or more additional brake positions may be provided between the position with the greatest brake force and the position with the smallest brake force. In order to provide for individual adjustment of the brake force of the additional brake positions, a mechanism combining the features of the modifications shown in Figs. 1 and 2 would have to be provided. The lever 41 in Fig. 2 would have to be replaced by the elbow lever 19, 20 of Fig. 1 and the cam disc 42 in Fig. 2 by the cam disc 25 of Fig. 1. The lowermost position of the arm 19 would be limited by the abutment 26. The cam surface portion $m$—$n$ of the cam disc 59 would correspond to the portion $a$—$e_1$ of the cam disc 25 in Fig. 1, so that the slide member 46 and the brake band 10 would remain in the lowermost position during the period which is controlled by the cam portion $a$—$e_1$. The portion $o$—$p$ of the cam disc 59 would be effective during the time in which the roller 24 engages the portion $e_1$—$f$. Since during this period the brake shoe 18 is in its lowermost position, the brake effect would be increased relatively to that produced by the cam portion $e$—$e_1$, by lifting the brake band 10. This increased brake force can be adjusted by changing the position of the fork 62. The brake force produced by the cam portion $e$—$e_1$ can be adjusted by proper setting of the abutment 26 and the brake force produced by the cam portion $c$—$d$ can be primarily adjusted by changing the position of the brake shoe by manipulation of the nuts 21.

Figure 7:
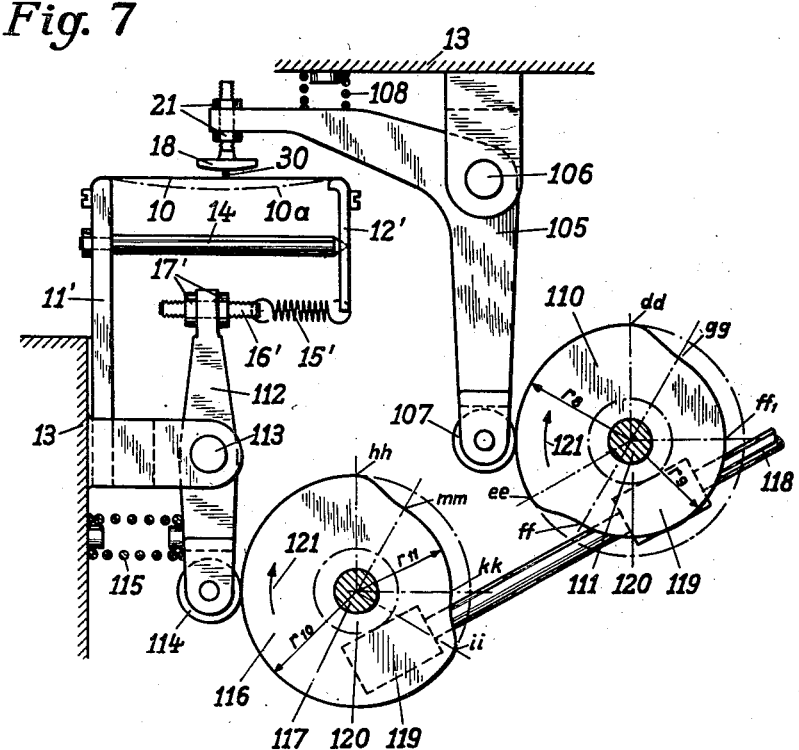
Fig. 7 is a diagrammatic front view of a further modification of thread brake according to the invention having a cam drive for the rigid brake element and an additional cam drive for controlling the tensioning force for the yieldable brake element.

In the embodiment illustrated in Fig. 7 the brake shoe 18 is adjustably mounted on an elbow lever 105 by means of nuts 21. The elbow lever 105 swings about a stationary fulcrum 106 and carries a roller 107 which is pressed against the cam disc 110 by the action of a spring 108. The ends of the brake band 10 are individually connected with a post 11' and a lever 12'. The latter is pressed against the free end of a pin 14 by means of a spring 15' connected to the lower end of the lever. One end of the spring 15' is connected to a bolt 16' which is mounted to the upper end of a two-arm lever 112 by means of nuts 17'. The lever 112 swings about a stationary pin 113 and carries at its lower end a roller 114 which is pressed by a spring 115 against a cam 116 mounted on a shaft 117.

The cam disc 110 which is mounted to a shaft 111 has a cam surface portion $dd$—$ee$ having a radius $r_8$ and has a surface portion $ff$—$gg$ having a radius $r_9$. The cam disc 116 has a portion $hh$—$ii$ having a radius $r_{10}$ and a portion $kk$—$mm$ having a radius $r_{11}$. The two cam discs are driven by a shaft 118 provided with worm gears 119 individually engaging worm wheels 120 on shafts 111 and 117.

In the illustrated position of the lever 105 the brake shoe 18 is in uppermost position, the roller 107 engaging the cam portion $dd$—$ee$ having the relatively great radius $r_8$. The brake is disengaged and the thread 30 runs freely between the brake shoe 18 and the brake band 10. Upon rotation of the shaft 118 and of the cam discs 110 and 116 in the direction of the arrow 121, the roller 107 engaging cam portion $ff$—$gg$ assumes its right end position and the brake shoe 18 its lowermost position. The brake band 10 is thereby deflected into the position $10a$, producing a brake effect which is determined by the position of the nuts 21. At this time the roller 114 engages the cam portion $hh$—$ii$. Upon continued rotation of the shaft 118, the roller 114 moves to the right engaging the cam portion $kk$—$mm$ whose radius $r_{11}$ is smaller than the radius $r_{10}$. Therefore, the bolt 16' moves to the left and the tension of the spring 15' is increased. The deflection of the brake band remains as indicated by the dash-dot line 10a. The brake force, however, is increased due to the greater tension of the spring 15' so that the increased tractive power of the spring 15' is effective, for example, when the roller 107 engages the cam portion $ff$—$gg$ of the cam disc 110. The tractive power of spring 15' can be adjusted by displacing the bolt 16' by manipulation of the nuts 17'. As a modification, the fulcrum 113 may be horizontally displaceable in the same manner as the pin 57 in Fig. 2 is vertically displaceable. In the latter case the tension of spring 15' would not be effected, if the lever 112 is in the illustrated position.

If the elbow lever 105 is replaced by the elbow lever 19, 20 of Fig. 1 and if the cam disc 110 is replaced by the cam disc 25 of Fig. 1, three brake positions having different constant brake forces would be available. In order to obtain still more brake positions having different braking effects, the cam disc 116 could be provided with three or more cam portions, the tension of spring 15' being different while a part of the different cam portions of the cam disc 110 is active.

What is claimed is:

1. A periodically acting thread brake for textile machines comprising a yieldable brake element, means for tensioning said yieldable brake element, a rigid brake element adapted to be pressed against said yieldable brake element for braking a thread moving between said two elements, and means for actuating at least one of said elements, said actuating means including first means for disengaging said elements, second means for pressing said elements against each other at a predetermined force, and third means for pressing said elements against each other at a force different from that produced by said second means; and means for individually adjusting the forces produced by said second and third means.

2. A periodically acting thread brake as defined in claim 1, in which said actuating means include a cam drive, said cam drive including at least three part-circular cam portions having different radii, a lever engaging and being actuated by said cam portions, said rigid brake element being adjustably connected with said lever, and an adjustable stationary abutment for limiting movement of said lever in one direction.

3. A periodically acting thread brake as defined in claim 1, comprising individual actuating means for each of said brake elements, each of said actuating means including adjusting means for producing a predetermined brake effect.

4. A periodically acting thread brake as defined in claim 1, comprising two cam drives, each of said drives including a cam follower lever, a lever supporting said rigid brake element and being rigidly connected with one of said cam follower levers and being adjustably connected with the other of said cam follower levers.

5. A periodically acting thread brake according to claim 4, each of said cam drives including a cam disc and means for adjusting the relative angular position of said cam discs.

6. A periodically acting thread brake as defined in claim 1, said rigid brake element being adjustably connected with a stationary part of the textile machine, said actuating means being connected with said yieldable brake element for periodically changing the position of said yieldable brake element relatively to said rigid brake element.

7. A periodically acting thread brake for textile machines comprising a yieldable brake element, means for tensioning said yieldable brake element, a rigid brake element adapted to be pressed against said yieldable brake element for braking a thread moving between said two elements, means for actuating at least one of said elements, said actuating means including means for disengaging and for engaging said elements, and control means connected with said means for tensioning said yieldable brake element, said control means including means for periodically effecting at least two different tensions of said yieldable brake element.

8. A periodically acting thread brake as defined in claim 7 including means operatively interconnecting said actuating means and said control means for interdependent timing of said actuating means and of said control means.

References Cited in the file of this patent

FOREIGN PATENTS

| 274,423 | Switzerland | June 16, 1951 |
| 605,475 | Great Britain | July 23, 1948 |